US010821935B2

(12) United States Patent
Faruque et al.

(10) Patent No.: US 10,821,935 B2
(45) Date of Patent: Nov. 3, 2020

(54) VEHICLE RESTRAINT SYSTEM

(71) Applicant: Ford Global Technologies, LLC, Dearborn, MI (US)

(72) Inventors: Mohammad Omar Faruque, Ann Arbor, MI (US); Dean M. Jaradi, Macomb, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 97 days.

(21) Appl. No.: 16/250,641

(22) Filed: Jan. 17, 2019

(65) Prior Publication Data

US 2020/0231114 A1    Jul. 23, 2020

(51) Int. Cl.
*B60R 22/26* (2006.01)
*B60R 22/02* (2006.01)

(52) U.S. Cl.
CPC ........ *B60R 22/26* (2013.01); *B60R 2022/027* (2013.01)

(58) Field of Classification Search
CPC ..... B60R 22/26; B60R 2022/006; B60R 2/43; B60R 2/688
See application file for complete search history.

(56) References Cited

U.S. PATENT DOCUMENTS

| | | | | |
|---|---|---|---|---|
| 3,343,623 A | * | 9/1967 | Porter | B60R 22/04 280/802 |
| 3,653,714 A | * | 4/1972 | Gentile | B60R 22/04 297/469 |
| 3,781,061 A | * | 12/1973 | Walz | B60R 22/04 297/469 |
| 3,794,135 A | * | 2/1974 | Ewert | B60R 22/04 280/802 |
| 3,795,411 A | * | 3/1974 | Takada | B60R 22/04 280/802 |
| 3,897,082 A | * | 7/1975 | Takada | B60R 22/04 280/802 |
| 4,629,214 A | * | 12/1986 | Fohl | B60R 22/03 280/808 |

(Continued)

FOREIGN PATENT DOCUMENTS

DE    102008026410 B4    11/2013
JP    2009241814 A    * 10/2009
(Continued)

OTHER PUBLICATIONS

Kenichi Uchida, Occupant Fixing Belt of Vehicular Seat, Oct. 22, 2009, EPO, JP 2009-241814 A, English Abstract (Year: 2009).*

(Continued)

*Primary Examiner* — James A English
(74) *Attorney, Agent, or Firm* — Frank A. MacKenzie; Bejin Bieneman PLC (57) ABSTRACT

A restraint system includes a seatback and a waist restraint. The waist restraint includes a housing having a middle portion fixed to the seatback and two arms extending outwardly from the middle portion. The waist restraint includes an extension deployable from each arm to a deployed position. The extensions are engaged with each other in the deployed position. Each arm is hinged to the middle portion and is pivotable towards the other arm.

20 Claims, 9 Drawing Sheets

(56) References Cited

U.S. PATENT DOCUMENTS

| | | | |
|---|---|---|---|
| 7,938,447 B2* | 5/2011 | Miyagawa | B60R 22/02 280/801.1 |
| 9,120,448 B2 | 9/2015 | Nagasawa | |
| 9,340,126 B2 | 5/2016 | Cuddihy et al. | |
| 9,758,127 B1* | 9/2017 | Farooq | B60R 22/26 |
| 2004/0036345 A1 | 2/2004 | Herberg et al. | |

FOREIGN PATENT DOCUMENTS

| | | | |
|---|---|---|---|
| JP | 2010143372 A | 7/2010 |
| JP | 2011079363 A | 4/2011 |

OTHER PUBLICATIONS

Kenichi Uchida, Occupant Fixing Belt of Vehicular Seat, Oct. 22, 2009, EPO, JP 2009-241814 A, Machine Translation of Description (Year: 2009).*

* cited by examiner

VEHICLE RESTRAINT SYSTEM

BACKGROUND

A vehicle may include amenities that allow occupants to face one another during operation of the vehicle. As one example, an autonomous vehicle may be autonomously operated, allowing occupants of the vehicle to ride in the vehicle without monitoring the operation of the vehicle. Specifically, the autonomous vehicle may include seats free to rotate during the operation of the vehicle. This may allow the occupants of the seats to face each other and to interact. This may also allow all of the occupants to relax, interact with one another, and focus on vehicle amenities. There remains an opportunity to design vehicle amenities for the occupants that takes into account the reduced operation monitoring provided by the autonomous vehicle.

DETAILED DESCRIPTION

A restraint system includes a seatback and a waist restraint including a housing having a middle portion fixed to the seatback and two arms extending outwardly from the middle portion. The waist restraint includes an extension deployable from each arm to a deployed position. The extensions are engaged with each other in the deployed position. Each arm is hinged to the middle portion and pivotable towards the other arm.

The housing may define a void extending through the middle portion and each arm.

Each extension may be partially disposed in the void of the middle portion.

The extensions may overlap each other in the void of the middle portion in an undeployed position.

The middle portion may include a wall extending transversely across the void. The extensions may be disposed on opposite side of the wall in the undeployed position.

The restraint system may include a latch disposed on one extension and a buckle disposed on the other extension. The latch and the buckle may be engageable with each other to an engaged position.

The restraint system may include a webbing fixed to each extension. The latch and the buckle may be disposed between the webbings.

Each webbing may be a shoulder belt.

Each extension may be bendable relative to the respective arm.

Each extension may be plastic.

The restraint system may include a motor engaged with each extension. Each of the motors may be supported by the seatback.

Each motor may contact the respective extension between the arms.

The motors may be laterally offset from each other.

The restraint system may include a processor and a memory storing instructions to deploy the extensions to the deployed position in response to detecting a presence of an occupant.

The memory may store instructions to retract the extensions from the deployed position in response to detecting the extensions are engaged with each other in an engaged position.

The memory may store instructions to stop retracting the extensions in response to the extensions engaging the occupant.

The memory may store instructions to retract the extensions from the deployed position in response to detecting the extensions are released from an engaged position to a disengaged position.

The restraint system may include a processor and a memory storing instructions to deploy the extensions to the deployed position in response to operation of a switch.

The memory may store instructions to retract the extensions in response to operation of a switch.

The seatback may include a first bolster and a second bolster spaced from each other. One arm may extend outwardly from the first bolster, and the other arm may extend outwardly from the second bolster.

The housing may have a semicircular shape, and each extension may have an arc shape.

With reference to the Figures, wherein like numerals indicate like parts throughout the several views, a vehicle 10 is generally shown. The vehicle 10 includes a restraint system 12 having a seatback 14 and a waist restraint 16. The waist restraint 16 includes a housing 18 having a middle portion 20 fixed to the seatback 14 and two arms 22 extending outwardly from the middle portion 20. The waist restraint 16 includes an extension 24 deployable from each arm 22 to a deployed position. The extensions 24 are engaged with each other in the deployed position. Each arm 22 is hinged to the middle portion 20 and is pivotable towards the other arm 22b.

In one example discussed below, the restraint system 12 may include a seat 26 that is rotatable. During a vehicle impact, the momentum of the occupant may bias the occupant away from the seat 26. In this situation, the waist restraint 16 may assist in retaining the occupant on the seat 26. By fixing the middle portion 20 of the waist restraint 16 to the seatback 14, the waist restraint 16 is rotatable with the seat 26. In other words, the middle portion 20 of the waist restraint 16 is fixed relative to the seat 26, which allows the waist restraint 16 to retain the occupant on the seat 26 regardless of a position or orientation of the seat 26. Furthermore, by hinging the arms 22 to the middle portion 20, the arms 22 may pivot towards each other when the extensions 24 are engaged with each other to such that the waist restraint 16 may provide an adaptive fit to the occupant of the seat 26.

The vehicle 10 may be any suitable type of automobile, e.g., a passenger or commercial automobile such as a sedan, a coupe, a truck, a sport utility vehicle, a crossover vehicle, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

Figure 1:
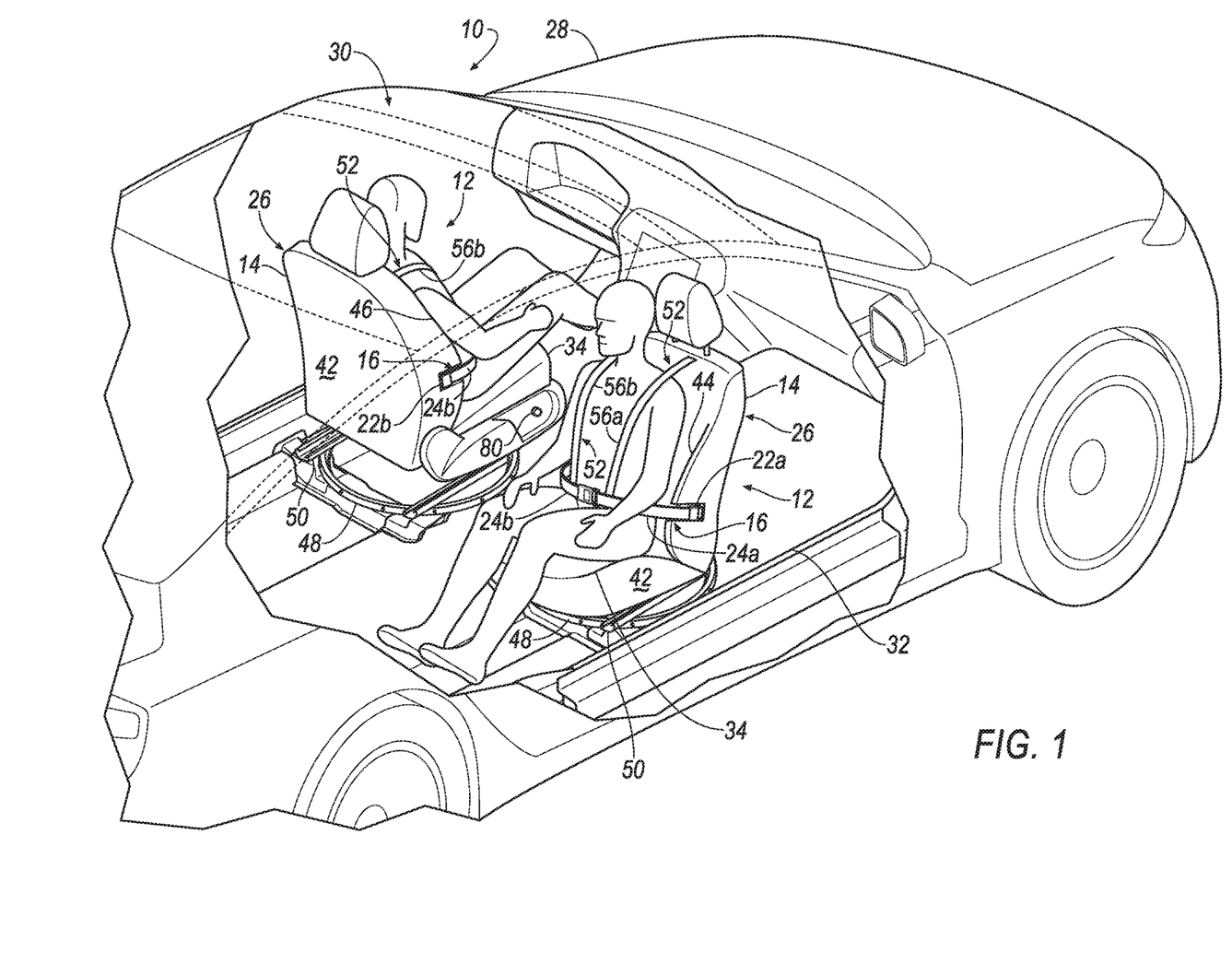
FIG. 1 is a perspective view of a vehicle including a restraint system.

With reference to FIG. 1, the vehicle 10 includes a body 28 defining a passenger cabin 30. The passenger cabin 30 houses occupants, if any, of the vehicle 10. The passenger cabin 30 includes a front end (not numbered) and a rear end (not numbered) with the front end being in front of the rear end during forward movement of the vehicle 10. The passenger cabin 30 includes one or more seats 26. The seats 26 may be arranged in any suitable arrangement. For example, one or more of the seats 26 may be at the front end of the passenger cabin 30, i.e., a front seat, and/or one or more of the seats 26 may be at the rear end of the passenger cabin 30, i.e., a rear seat.

With continued reference to FIG. 1, the body 28 includes a floor 32. The floor 32 may define the lower boundary of the passenger cabin 30 and may extend from the front end of the passenger cabin 30 to the rear end of the passenger cabin 30. The floor 32 may include a floor panel and upholstery on the floor 32 panel. The upholstery may be, for example, carpet, and may have a class-A surface facing the passenger compartment, i.e., a surface specifically manufactured to have a high quality, finished, aesthetic appearance free of blemishes. The floor 32 may include cross-beams (not shown) connected to the panel and to other components of the body 28.

Figure 2:
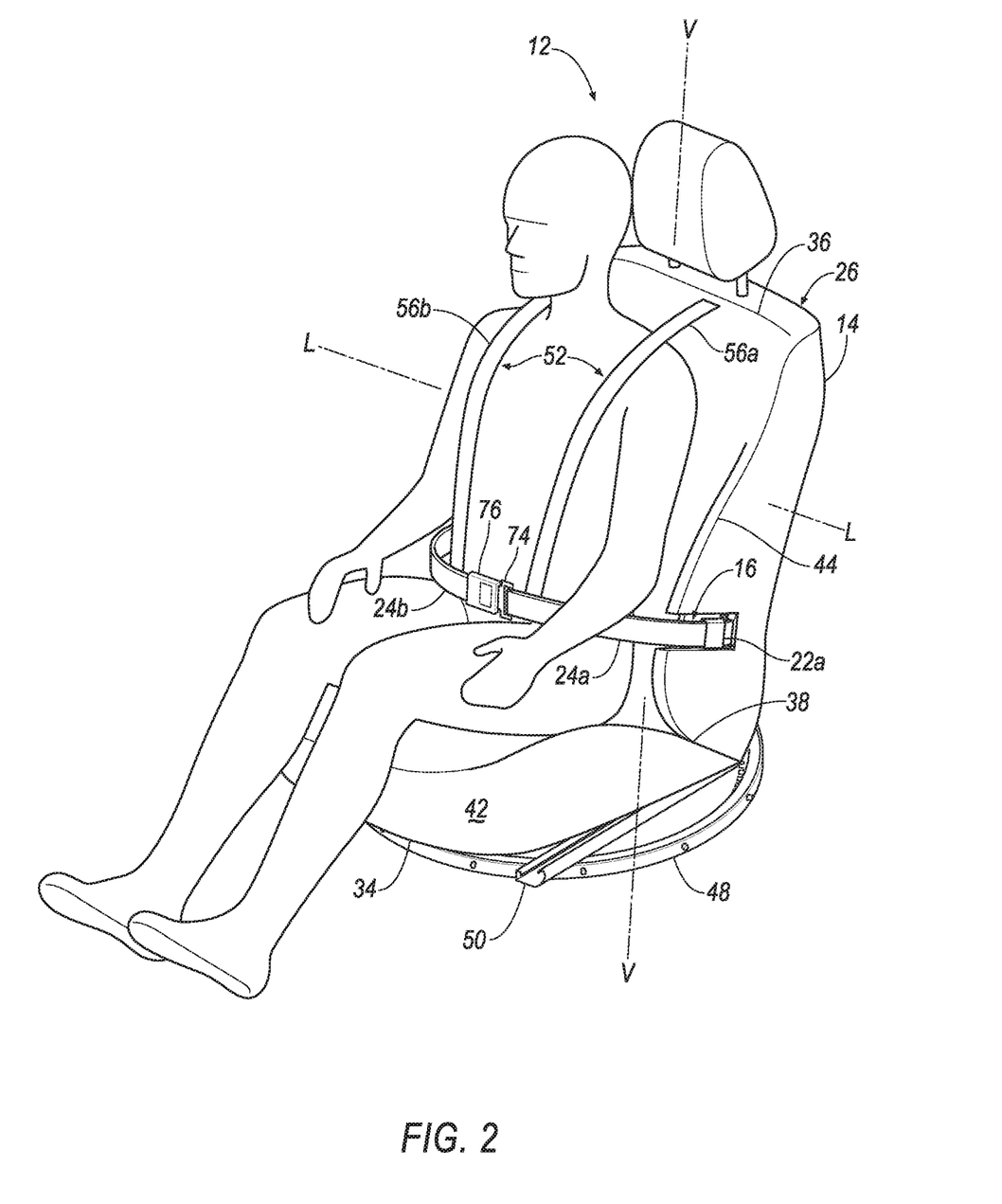
FIG. 2 is a perspective view of a seat including a waist restraint in an undeployed position.
Figure 3:
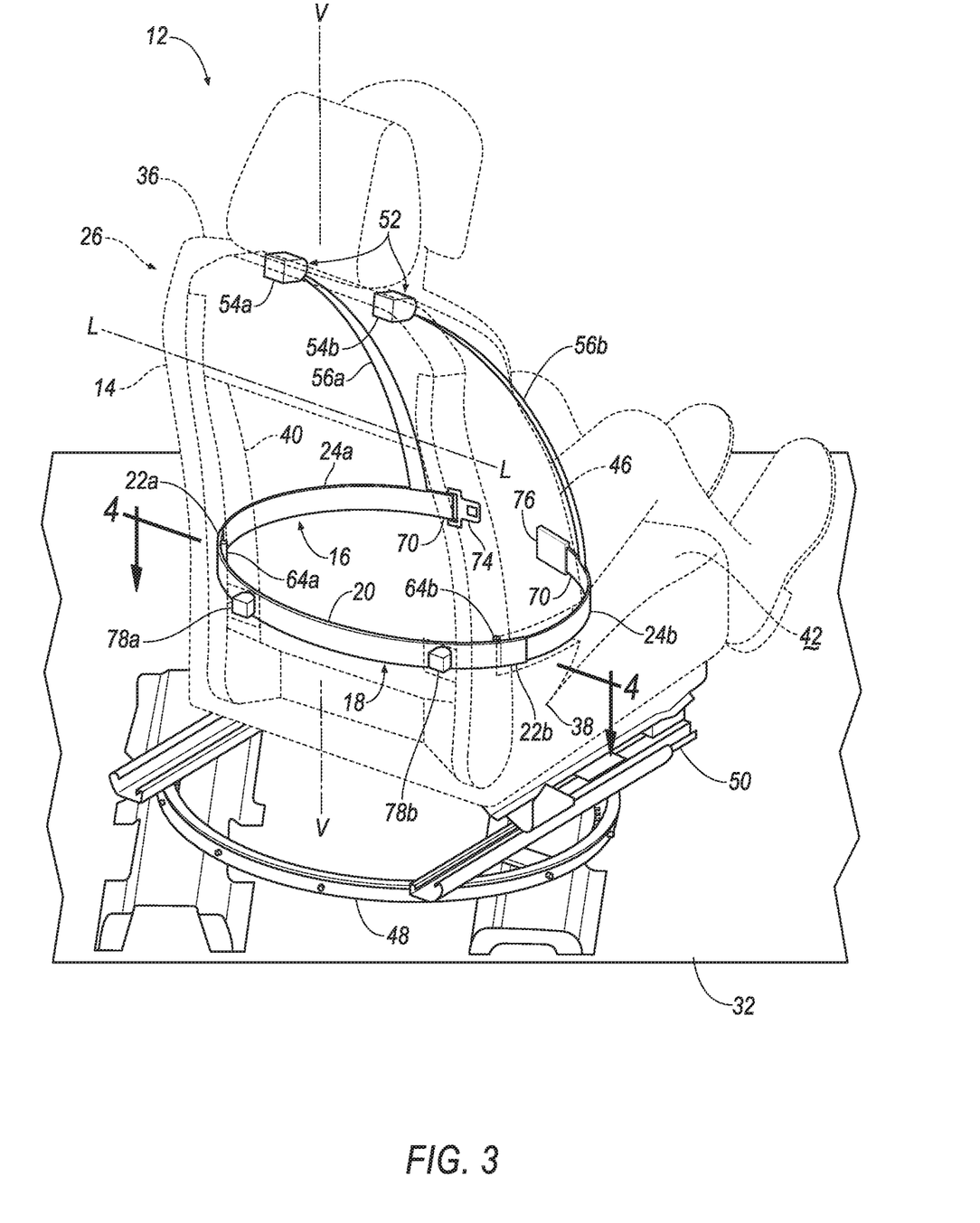
FIG. 3 is a perspective view of the seat including a seat frame supporting the waist restraint in a deployed position.

With reference to FIGS. 2 and 3, each seat 26 may include the seatback 14, a seat bottom 34, and a head restraint (not numbered). The head restraint may be supported by the seatback 14 and may be stationary or movable relative to the seatback 14. The seatback 14 may be supported by the seat bottom 34 and may be stationary or movable relative to the seat bottom 34. The seatback 14, the seat bottom 34, and/or the head restraint may be adjustable in multiple degrees of freedom. Specifically, the seatback 14, the seat bottom 34, and/or the head restraint may themselves be adjustable, in other words, adjustable components within the seatback 14, the seat bottom 34, and/or the head restraint, and/or may be adjustable relative to each other.

With reference to FIGS. 2 and 3, each seat 26 may define a lateral axis L extending from one side of the seat 26 to the other side of the seat 26, as shown in FIG. 2. Each seat 26 may define a vertical axis V extending transverse to the lateral axis L, as shown in FIG. 2. For example, the vertical axis V may extend through the seat bottom 34 and the floor 32.

With reference to FIGS. 2 and 3, the seatback 14 may include an upper end 36 and a lower end 38 spaced from each other along the vertical axis V of the seat 26. The lower end 38 may be adjacent to the seat bottom 34. The upper end 36 may be adjacent to the head restraint. Specifically, the upper end 36 of the seatback 14 may support the head restraint.

With reference to FIG. 3, the seat 26 may include a seat frame 40 and a covering 42 supported on the seat frame 40. The seat frame 40 may include tubes, beams, etc. The seat frame 40 may support cushions in the seatback 14, seat bottom 34, and/or head restraint. The seat frame 40 may be any suitable plastic material, e.g., carbon fiber reinforced plastic (CFRP), glass fiber-reinforced semi-finished thermoplastic composite (organosheet), etc. As another example, some or all components of the seat frame 40 may be formed of a suitable metal, e.g., steel, aluminum, etc.

The covering 42 of the seat 26 may include upholstery and padding. The upholstery may be cloth, leather, faux leather, or any other suitable material. The upholstery may be stitched in panels around the seat frame 40. The padding may be between the covering 42 and the seat frame 40 and may be foam or any other suitable material. The covering 42 may include a class-A surface.

With reference to FIG. 2, the seatback 14 has a first bolster 44 and a second bolster 46. The bolsters are spaced from each other along the lateral axis L of the seat 26. The seatback 14 may terminate at the bolsters. A backrest (not numbered) may extend from the first bolster 44 to the second bolster 46. The bolsters may extend from the backrest in a direction that an occupant of the seat 26 would face, that is, in a forward direction as defined by the seat 26. The bolsters may extend along the seatback 14 in an upward direction as defined by the seat 26. For example, the bolsters may extend from the lower end 38 towards the upper end 36 of the seatback 14, i.e., along the vertical axis V. The bolsters may support an occupant laterally relative to the seat 26.

Each seat 26 is supported by the floor 32, as shown in FIG. 1. Each seat 26 may, for example, be fixed relative to the floor 32. In this situation, the seat 26 may be immovable relative to the floor 32. As another example, the position and orientation of the seats 26 and components thereof may be adjustable by an occupant. In this situation, each seat 26 may slide relative to the floor 32, e.g., in the vehicle fore-and-aft direction. Additionally, or alternatively, each seat 26 may be rotatable relative to the floor 32. For example, each seat 26 may be supported by a pivotable base 48 supported by the floor 32, supported by a track fixed to the floor 32, etc., as shown in FIGS. 1-3 Each seat 26 may pivot about the vertical axis V. In other words, the seat 26 is rotatable to face in different directions. For example, one seat 26 in FIG. 1 is facing forwardly and the other seat 26 in FIG. 1 is facing rearwardly. The seat 26 may rotate completely, i.e. 360° about the axis. The seat 26 may rotate to face any number of directions.

With reference to FIG. 3, as one example, the seat 26 may include a base 48 mounted to the floor 32 and a seat track 50 mounted to the base 48. The seat track 50 may be supported on the base 48 and the seat bottom 34 may be supported on the seat track 50. The base 48 may be rotatable relative to the floor 32.

The base 48 may be of any suitable configuration. As one example, the base 48 may include a fixed ring (not numbered) and a rotatable ring (not numbered), as shown in FIG. 3. In such an example, the fixed ring is fixed to the floor 32, i.e., the fixed ring does not move relative to the floor 32. The rotatable ring is concentric with the fixed ring, i.e., the fixed ring and the rotatable ring share a common center point. The rotatable ring is rotatably supported by the fixed ring. The rotatable ring rotates relative to the fixed ring, allowing the seat 26 to rotate relative to the fixed ring.

The seat track 50 supports the seat bottom 34 on the base 48, e.g., on the rotatable ring. The seat 26 is selectively slidable relative to the seat track 50. In other words, the occupant may slide the seat bottom 34 along the seat track 50 and may secure the seat bottom 34 to the seat track 50 at a selected position.

The vehicle 10 may include any suitable number of restraint systems 12, e.g., one restraint system 12 for each seat 26. The restraint system 12 includes two seatbelt assemblies 52. One seatbelt assembly 52 is engaged with each extension 24. Each seatbelt assembly 52 includes a retractor 54 and a webbing 56 retractably engaged with the retractor 54. In other words, each restraint system 12 includes two retractors, i.e., a first retractor 54a and a second retractor 54b, and two webbings, i.e., a first webbing 56a and a second webbing 56b. Specifically, the first webbing 56a is retractably engaged with the first retractor 54a and the second webbing 56b is retractably engaged with the second retractor 54b, as shown in FIG. 3. The first retractor 54a is a separate component from the second retractor 54b, and the first webbing 56a is a separate component from the second webbing 56b.

With reference to FIG. 3, the first retractor 54a may be attached to the seatback 14. Specifically, the first retractor 54a may be mounted to the seat frame 40. The first retractor 54a may be mounted to the seat frame 40 by, e.g., fasteners, bolts, welding, etc. The first retractor 54a may be disposed adjacent to one shoulder of an occupant of the seat 26. In other words, the first retractor 54a may be disposed adjacent to both the upper end 36 of the seatback 14 and one side of the seat 26. For example, the first retractor 54a may be disposed above the first bolster 44, i.e., between the first bolster 44 and the upper end 36 of the seatback 14.

With continued reference to FIG. 3, the first webbing 56a is elongated from one extension 24a to the first retractor 54a. For example, the first webbing 56a may include a first end (not shown) retractably engaged with the first retractor 54a and a second end (not numbered) attached to one extension 24a. In this situation, the first retractor 54a may be covered by the covering 42 of the seat 26. In other words, the first webbing 56a may extend through the covering 42. For example, the covering 42 may include a slot (not shown) disposed adjacent to the first retractor 54a, and the first webbing 56a may extend through and be moveable relative to the slot. The first webbing 56a may be, e.g., a shoulder belt, i.e., a webbing extending over a shoulder and vertically along a torso of an occupant of the seat 26. The first webbing 56a is coupled to the first retractor 54a, such as attached to and wound about the spool. The first webbing 56a may be formed of fabric, e.g., nylon fabric, in the shape of a strap.

With continued reference to FIG. 3, the second retractor 54b may be attached to the seatback 14. Specifically, the second retractor 54b may be mounted to the seat frame 40. The second retractor 54b may be mounted to the seat frame 40 by, e.g., fasteners, bolts, welding, etc. The second retractor 54b may be spaced from the first retractor 54a. For example, the second retractor 54b may be disposed adjacent to the other shoulder of an occupant of the seat 26. In other words, the second retractor 54b may be disposed adjacent to both the upper end 36 of the seatback 14 and the other side of the seat 26. Said differently, the second retractor 54b may be disposed above the second bolster 46, i.e., between the second bolster 46 and the upper end 36 of the seatback 14.

With continued reference to FIG. 3, the second webbing 56b is elongated from the other extension 24b to the second retractor 54b. For example, the second webbing 56b may include a first end (not shown) retractably engaged with the second retractor 54b and a second end (not numbered) attached to the other extension 24b. In this situation, the second retractor 54b may be covered by the covering 42 of the seat 26. In other words, the second webbing 56b may extend through the covering 42. For example, the covering 42 may include a slot (not shown) disposed adjacent to the second retractor 54b, and the second webbing 56b may extend through and be moveable relative to the slot. The second webbing 56b may be, e.g., a shoulder belt, i.e., a webbing extending over a shoulder and vertically along a torso of an occupant of the seat 26. The second retractor 54b is coupled to the second webbing 56b, such as attached to and wound about the spool. The second webbing 56b may be formed of fabric, e.g., nylon fabric, in the shape of a strap. The second webbing 56b is a separate component from the first webbing 56a; in other words, each restraint system 12 includes two webbings.

The housing 18 may be supported by the seatback 14. For example, the housing 18 may be fixed to the seat frame 40, as shown in FIG. 3. Specifically, the middle portion 20 may be fixed to the seat frame 40. The housing 18 may, for example, be disposed at least partially in the seatback 14. In this situation, the covering 42 of the seatback 14 may extend at least partially over the housing 18. The housing 18 may extend from the first bolster 44 to the second bolster 46. Specifically, the housing 18 may extend outwardly from each bolster 44, 46. The housing 18 is disposed closer to the lower end 38 of the seatback 14 than the upper end 36 of the seatback 14. The housing 18 may be fixed to the seat frame 40 in any suitable manner, e.g., fasteners, adhesive, welding, etc.

Figure 4A:
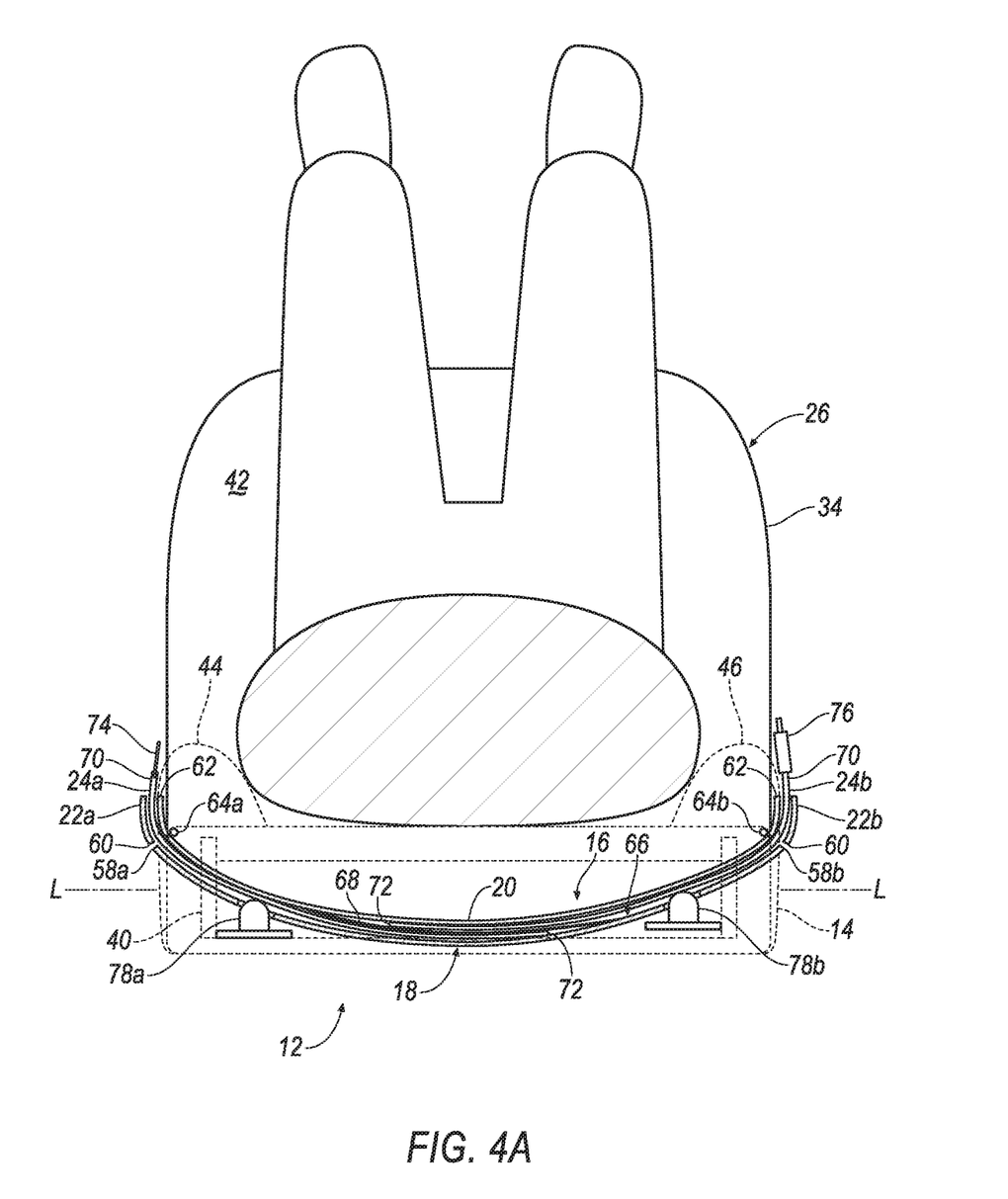
FIG. 4A is a cross-sectional view of the seat along line 4 with the waist restraint in the undeployed position.
Figure 4B:
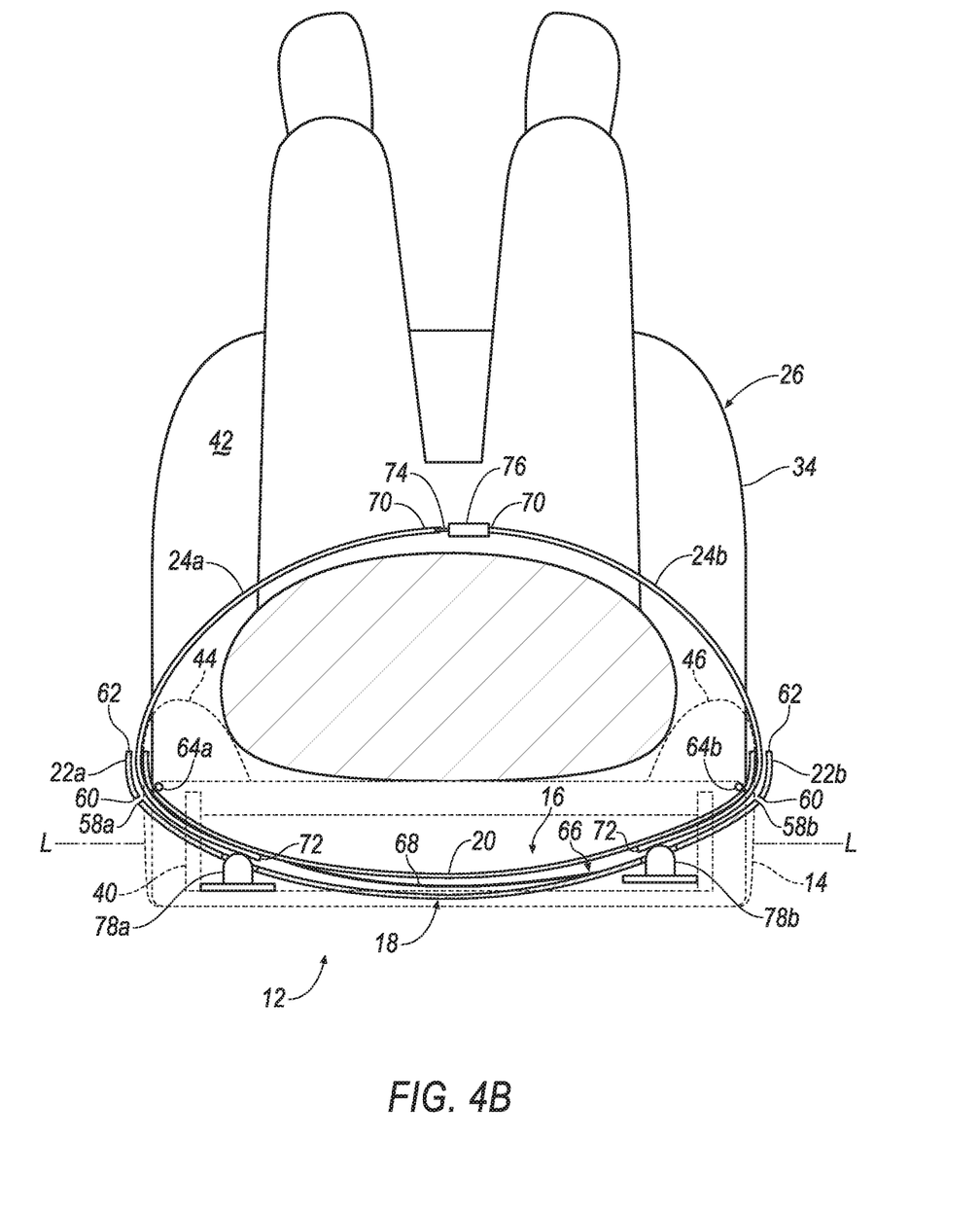
FIG. 4B is a cross-sectional view of the seat along line 4 with the waist restraint in the deployed position.
Figure 4C:
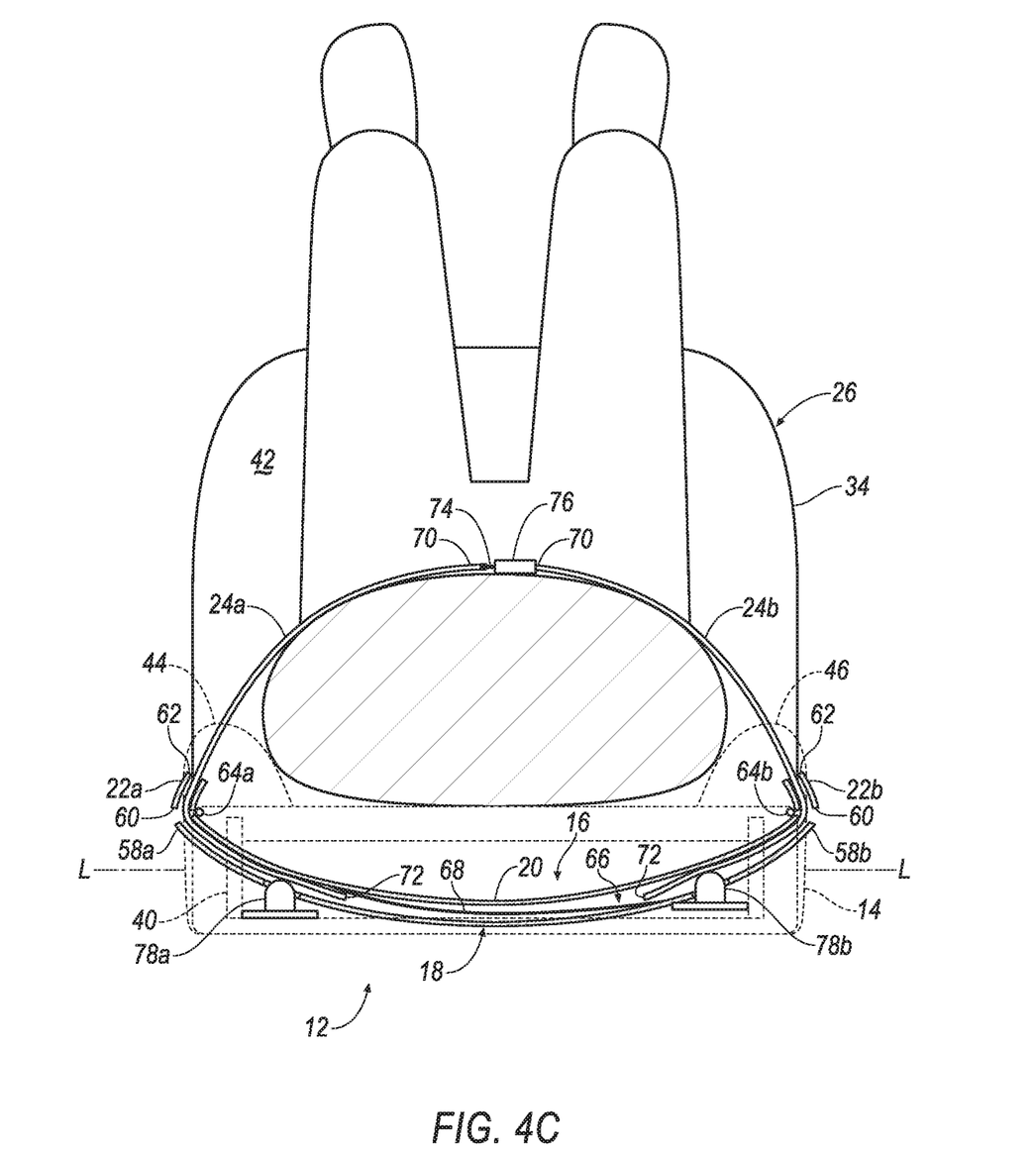
FIG. 4C is a cross-sectional view of the seat along line 4 with the waist restraint retracted toward a seatback.
Figure 5A:
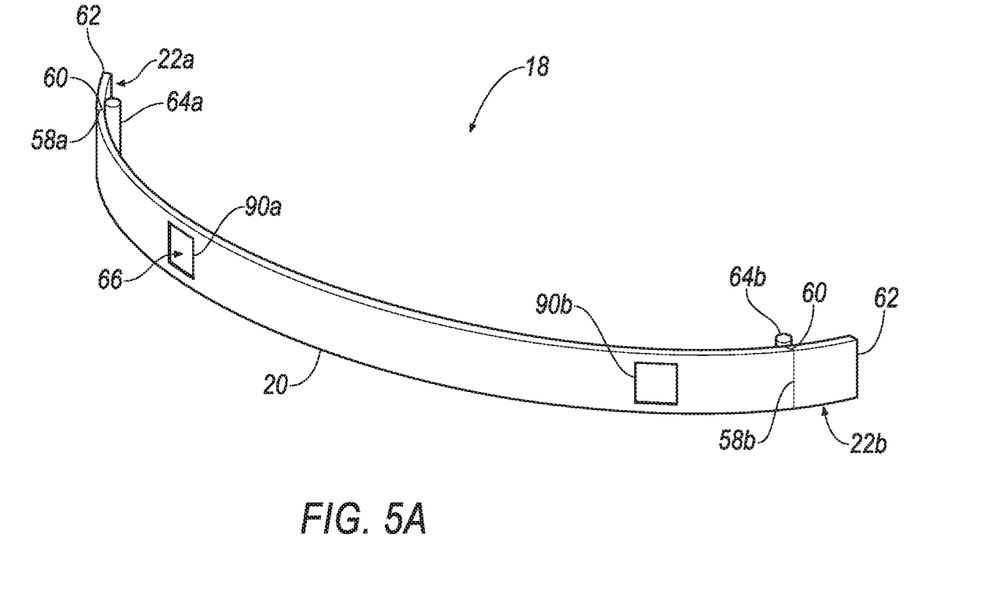
FIG. 5A is a perspective view of one embodiment of a housing of the waist restraint.
Figure 5B:
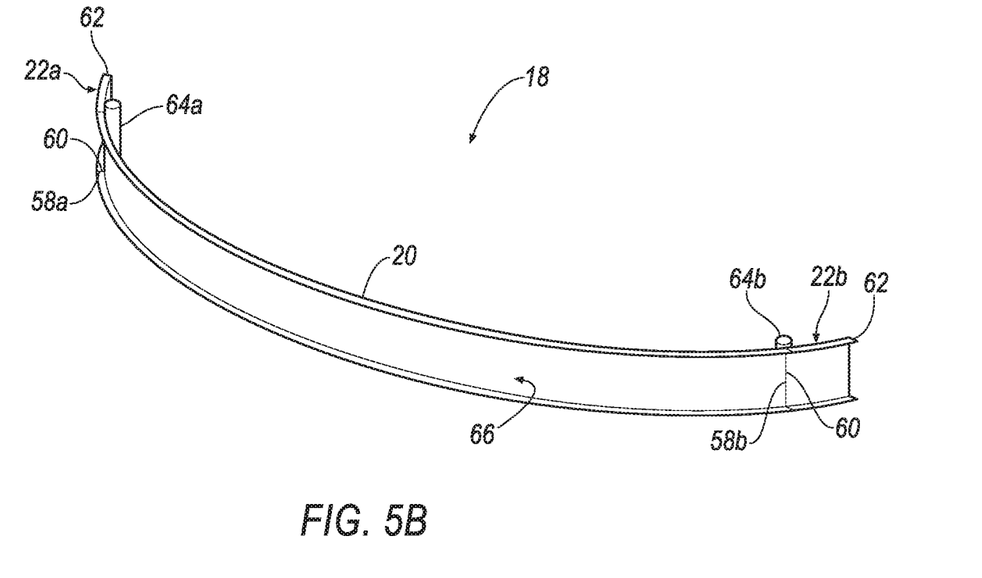
FIG. 5B is a perspective view of another embodiment of the housing of the waist restraint.

The housing 18 may have a semicirclular shape in a plane transverse to the vertical axis V of the seat 26, e.g., along the lateral axis L, as shown in FIGS. 4A-4C. The housing 18 may have any suitable shape in cross section along the vertical axis V of the seat 26. For example, the housing 18 may have a tubular shape in cross section along the vertical axis V of the seat 26, as shown in FIG. 5A. In other words, the housing 18 may have a polygon, i.e., closed, shape with a hollow center. In such an example, the housing 18 may include slots 90 extending through the housing 18, e.g., the middle portion 20, into the void 66. The slots 90 may be spaced from each other along the middle portion 20. For example, one slot 90a may be adjacent one edge 58a of the middle portion 20 and the other slot 90b may be adjacent the other edge 58b of the middle portion 20. The slots 90 may have any suitable size and shape. Alternatively, the housing 18 may have a C-shape, i.e., an open shape, in cross section along the vertical axis V of the seat 26, as shown in FIG. 5B. The housing 18 may be formed of any suitable material, e.g., steel, aluminum, plastic, etc.

The middle portion 20 of the housing 18 is fixed relative to the seatback 14. In other words, the middle portion 20 of the housing 18 does not move relative to the seatback 14. The middle portion 20 may be disposed between the first bolster 44 and the second bolster 46, as shown in FIG. 3. In other words, the middle portion 20 may be entirely covered by the covering 42 of the seatback 14. The middle portion 20 may include edges 58 spaced from each other along the lateral axis L. The middle portion 20 may have an arc shape along the lateral axis L from one edge 58a to the other edge 58b.

Each arm 22 extends outwardly from the middle portion 20, as set forth above. Specifically, each arm 22 extends in opposite directions outwardly from the middle portion 20. In other words, one arm 22a extends from one edge 58a of the middle portion 20 through the first bolster 44, and the other arm 22b extends from the other edge 58b of the middle portion 20 through the second bolster 46, as shown in FIGS. 3-4C.

Each arm 22 may extend from a first end 60 to a second end 62 spaced from the first end 60. The first end 60 of each arm 22 may be adjacent to one edge 58a of the middle portion 20, respectively. The second end 62 of each arm 22 may be disposed outside the seatback 14, i.e., not covered by the covering 42. In other words, each arm 22 is partially disposed in the seatback 14, i.e., extends partially outside the seatback 14, as shown in FIGS. 4A-4C. Each arm 22 may have an arc shape from the first end 60 to the second end 62.

With reference to FIGS. 5A and 5B, each arm 22 of the housing is hinged to the middle portion 20 of the housing, as set forth above. For example, the housing 18 may include a hinge 64 on each edge 58 of the middle portion 20. In such an example, the housing 18 may include one hinge 64a attached to one edge 58a of the middle portion 20 and the first end 60 of one arm 22a, and another hinge 64b attached to the other edge 58b of the middle portion 20 and the first end 60 of the other arm 22b. The hinges 64 may be positioned to allow the arms 22 to pivot towards each other, i.e., toward an occupant. In other words, the arms 22 may pivot about the hinges 64 inwardly relative to the seat 26. The hinges 64 may be any suitable type of hinge, e.g., a butt hinge, a butterfly hinge, a gate hinge, a pivot hinge, a spring hinge, living hinge, etc.

With reference to FIGS. 4A-4C, the housing 18 may define a void 66 extending from the second end 62 of one arm 22a to the second end 62 of the other arm 22b. In other words, the void 66 extends through each arm 22 and the middle portion 20. The void 66 may partially house each extension 24. In other words, at least a portion of each extension 24 may be disposed in the void 66. Said differently, each extension 24 may extend outwardly from the void 66, i.e., each arm 22.

The housing 18 may include a wall 68 disposed in the void 66. Specifically, the wall 68 may be disposed in the void 66 at the middle portion 20 of the housing 18. The wall 68 may extend transversely, i.e., at a right angle or otherwise, across the void 66. For example, as shown in FIGS. 4A-4C, the wall 68 may extend obliquely across the void 66. In other words, the wall 68 may extend transverse to the lateral axis L. The wall 68 may be formed of a same or different material as the housing 18.

With continued reference to FIGS. 4A-4C, each extension 24 extends through the respective arm 22 into the middle portion 20 of the housing 18. For example, each extension 24 may be elongated from a first terminus 70 to a second terminus 72. The second terminus 72 of each extension 24 is disposed in the void 66. Specifically, the second terminus 72 of each extension 24 is disposed in the middle portion 20 of the housing 18. The second terminus 72 of each extension 24 may, for example, be disposed on opposite sides of the wall 68. Said differently, the extensions 24 may be disposed on opposite sides of the wall 68. The first terminus 70 of each extension 24 is disposed outwardly from the housing 18. In other words, the second end 62 of the respective arm 22 is disposed between the first terminus 70 and the second terminus 72 of the respective extension 24.

The extensions 24 may be deployable from an undeployed position, as shown in FIG. 4A, to the deployed position, as shown in FIG. 4B. In the undeployed position, the first terminus 70 of each extension 24 may be closer to the second end 62 of each arm 22 as compared to the deployed position. In other words, the second terminus 72 of each extension 24 may be closer to the wall 68 in the undeployed position as compared to the deployed position. In the undeployed position, the extensions 24 may, for example, overlap each other in the void 66. In other words, a portion of one extension 24 may cross in front of a portion of the other extension 24 in the void 66, i.e., the portion of one extension 24 may be disposed in front of the portion of the other extension 24. In such an example, the second terminus 72 of one extension 24a may be disposed between the first terminus 70 and the second terminus 72 of the other extension 24b, and the second terminus 72 of the other extension 24b may be disposed between the first terminus 70 and the second terminus 72 of the one extension 24a, as shown in FIG. 4A. As another example, each extension 24, e.g., the second terminus 72, may abut the wall 68 on opposite sides of the wall 68 in the undeployed position.

In the deployed position, each extension 24 extends farther outwardly from the respective arm 22 as compared to the undeployed position. In other words, the first terminus 70 of the respective extension 24 is farther from the first end 60 of the respective arm 22 in the deployed position as compared to the undeployed position. Said differently, the second terminus 72 of the respective extension 24 is closer to the second end 62 of the respective arm 22, i.e., the respective bolster 44, 46, as compared to the undeployed position. The extensions 24 may be spaced from each other in the void 66 in the deployed position. In other words, the extensions 24 may not overlap each other in the deployed position.

Each extension 24 is bendable relative to the housing 18, e.g., the respective arm 22. Said differently, the housing 18, e.g., the arms 22, may be more rigid, i.e., resist deformation more, than the extensions 24. For example, each extension 24 may bend inward relative to the seat 26 in the deployed position to engage the other extension 24b as shown in FIGS. 4B and 4C. Each extension 24 has an arc shape in the plane normal to the vertical axis V of the seat 26. The extensions 24 may be formed of any suitable material, e.g., plastic, rubber. Each extension 24 may elastically deform, i.e., may return to the original shape when released.

In the undeployed position, the first terminuses 70 of the extensions 24 are spaced from each other along the lateral axis L, e.g., by the seatback 14. In the deployed position, the first terminuses 70 of the extensions 24 are engageable with each other. For example, the restraint system 12 may include locking elements engageable with each other. The locking elements may, for example, be manually engaged with each other. In other words, an occupant may physically engage the locking elements together. As another example, the locking elements may automatically engage with each other, e.g., the extensions 24 may have a shape such that the locking elements are aligned with each other in the deployed position.

The locking elements may be a latch 74 disposed on one extension 24a and a buckle 76 disposed on the other extension 24b. Specifically, the latch 74 may be disposed on the first terminus 70 of one extension 24a and the buckle 76 may be disposed on the first terminus 70 of the other extension 24b. The latch 74 and the buckle 76 may be disposed between the webbings 56, as shown in FIG. 2. For example, the first webbing 56a may be fixed to the extension 24 between the latch 74 and the second end 62 of the one arm 22a, and the second webbing 56b fixed to the extension 24 between the buckle 76 and the second end 62 of the other arm 22b.

The latch 74 and the buckle 76 are selectively engageable with each other from a disengaged position, as shown in FIG. 4A, to an engaged position, as shown in FIGS. 4B and 4C. In the disengaged position, the latch 74 and the buckle 76 are spaced from each other. In this situation, each extension 24 is moveable relative to the other extension 24b. In the engaged position, the latch 74 and the buckle 76 are fixed relative to each other. In this situation, the latch 74 and the buckle 76 may prevent the extensions 24 from moving relative to each other. Additionally, in the engaged position, the extensions 24 may retain an occupant on the seat 26. The buckle 76 and the latch 74 may be separate components subsequently fixed to the first terminus 70 of the respective extension 24. Alternatively, the buckle 76 and the latch 74 may be integral, i.e., formed uniformly, with the respective extension 24.

With reference to FIG. 3, the restraint system 12 may include two motors 78. Each of the motors 78 may be supported by the seatback 14. For example, the motors 78 may be fixed to the seat frame 40, e.g., directly or through intermediate components, such as a bracket. Each of the motors 78 is disposed between the edges 58 of the middle portion 20, i.e., the hinges 64.

With reference to FIGS. 4A-4C, the motors 78 may be engaged with the extensions 24, e.g., to drive the extensions 24 between the undeployed position and the deployed position. For example, one motor 78a may engage one extension 24a and the other motor 78b may engage the other extension 24b. Each motor 78 may engage the respective extension 24 in the middle portion 20 of the housing 18, i.e., between the hinges 64. In other words, each motor 78 may contact the respective extension 24 between the arms 22 of the housing 18. For example, each motor 78 may extend through the respective slot 90 of the housing 18 into the void 66. In this situation, one motor 78a may extend through one slot 90a and the other motor 78b may extend through the other slot 90b.

With continued reference to FIG. 4A-4C, the motors 78 may, for example, be laterally offset from each other. In other words, the motors 78 may not be aligned along the lateral axis L. For example, one motor 78a may be positioned closer to the occupant relative to the other motor 78b. In this situation, the one motor 78a may extend farther into the void 66 than the other motor 78b. In such an example, the one motor 78a may deflect the one extension 24a more toward the occupant, such that the one extension 24a is disposed closer to the occupant than the other extension 24b, i.e., more forward. In other words, the motors 78 may assist in positioning the extensions 24 such that the extensions 24 overlap each other in the undeployed position.

Each motor 78 may be engaged with the respective extension 24 in any suitable manner. For example, the motors 78 may be friction drive motors. In such an example, the motors 78 may include a wheel contacting the respective extension 24 and drives the respective extension 24 through friction contact. As another example, the motors 78 may include a gear that engages the respective extension 24. In such an example, the extensions 24 each may include a rack, i.e., gear teeth, extending along the extensions 24, e.g., from the second terminus 72 toward the first terminus 70. In this situation, the gears of the motors 78 may engage the rack of the respective extension 24 to drive the extension 24. In other words, the motors 78 and the respective extensions 24 may be referred to as "a rack and pinion drive."

Each motor 78 may be an electric motor. Each motor 78 may be any suitable type of electric motor. For example, each motor 78 may be a brushless DC motor. Alternatively, each motor 78 may be a brushed DC motor, a rotary magnetic motor, or any other suitable type of electric motor. Each motor 78 may drive the respective extension 24 at a constant speed. In other words, each motor 78 may provide a uniform input to the respective extension 24.

The restraint system 12 may include a switch 80 that actuates the motors 78. The switch 80 may be on the seat 26, as shown in FIG. 1. The switch 80 may be any suitable type of switch that receives input from the occupant e.g., a finger-operated mechanical switch, a graphical user interface, etc. When the switch 80 is activated by the occupant, the switch 80 engages the motors 78 to drive the extensions 24 between the undeployed position and the deployed position. As another example, the extensions 24 may be manually moved between the undeployed position and the deployed position. In this situation, an occupant may physically grab each extension 24 and pull the extensions 24, i.e., from the seatback 14, from the undeployed position to the deployed position. In such an example, the occupant may push the extensions 24, i.e., into the seatback 14, from the deployed position to the undeployed position. As yet another example, the motors 78 may be automatically engaged, e.g., by a computer, to drive the extensions 24 between the undeployed position and the deployed position.

In the situation when the extensions 24 are deployable by operation of the switch 80 or by a computer, the motors 78 are engaged with the extensions 24, i.e., the motors 78 remain engaged with the respective extension 24 in both the undeployed position and the deployed position. In the situation when the extensions 24 are manually deployable, each motor 78 may be engageable with the respective extension 24. In the undeployed position, each motor 78 may, for example, be disengaged from the respective extension 24. In other words, each motor 78 may be spaced from the extensions 24 in the undeployed position. In this situation, the extensions 24 may move, e.g., slide, freely relative to the housing 18 and the void 66. Additionally, each motor 78 may be engaged with the respective extension 24 when the extensions 24 are in the engaged position. For example, each motor 78 may contact the respective extension 24 in the deployed position. In this situation, each extension 24 may not move relative to the respective motor.

Figure 6:
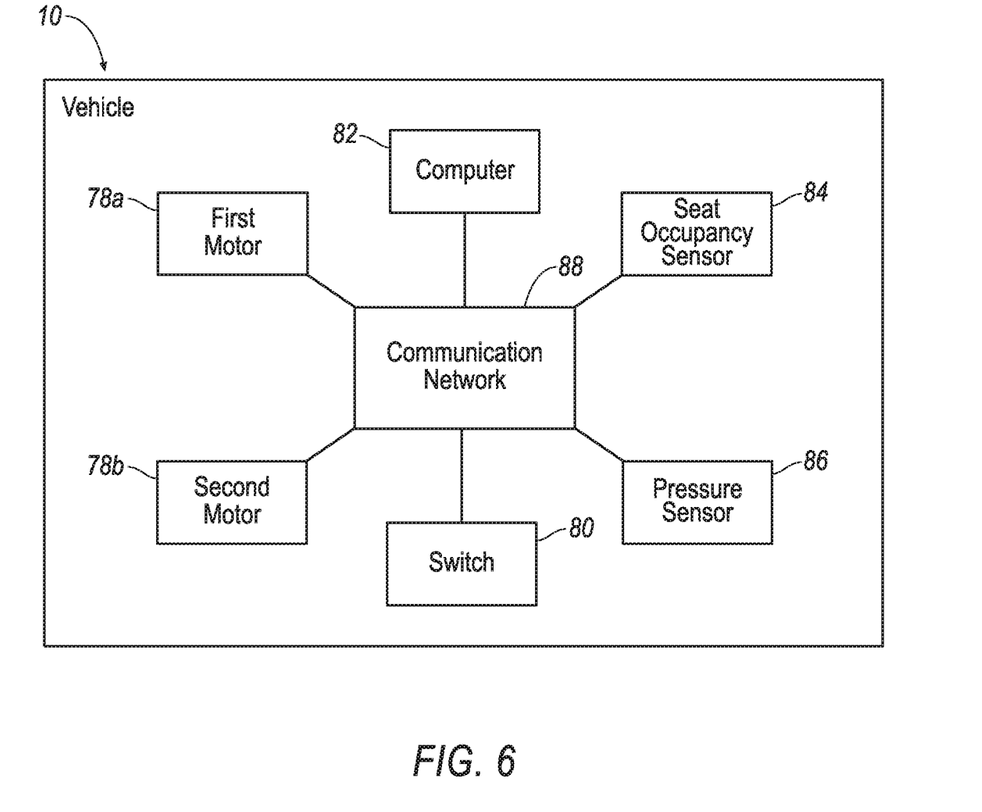
FIG. 6 is a block diagram of the restraint system of the vehicle.

With reference to FIG. 6, the restraint system 12 may include a computer 82. The computer 82 may be a microprocessor-based computing device implemented via circuits, chips, or other electronic components. For example, the computer 82 may include a processor, memory, etc. The memory of the controller may store instructions executable by the processor as well as data and/or databases.

With continued reference to FIG. 6, the restraint system 12 includes a seat occupancy sensor 84. The seat occupancy sensor 84 may detect an occupant seated on the seat 26. The seat occupancy sensor 84 may be any suitable type, e.g., post-contact sensors such as pressure sensors and contact switches; and pre-contact sensors such as radar, LIDAR, and vision-sensing systems. The vision systems may include one or more cameras, CCD image sensors, CMOS image sensors, etc. The restraint system 12 may include a plurality of seat occupancy sensors 84, e.g., one seat occupancy sensor 84 for each seat 26. Each seat occupancy sensor 84 may be supported by any suitable vehicle component, e.g., the seat 26, the body 28, etc.

With continued reference to FIG. 6, the restraint system 12 may include a pressure sensor 86. The pressure sensor 86 may detect the extensions 24 engaging the occupant. The restraint system 12 may include a plurality of pressure sensors 86. Each pressure sensor 86 may be supported by any suitable component of the restraint system 12, e.g., on one extension 24a, on the buckle 76, in the motors 78, etc.

With continued reference to FIG. 6, the vehicle 10 may include a communication network 88. FIG. 6 is a block diagram of the communication network 88. The communication network 88 includes hardware, such as a communication bus, for facilitating communication among vehicle components, e.g., the motors 78 the switch 80, the computer 82, the seat occupancy sensor 84, the pressure sensor 86, etc. The communication network 88 may facilitate wired or wireless communication among the vehicle components in accordance with a number of communication protocols such as controller area network (CAN), Ethernet, WIFI, Local Interconnect Network (LIN), and/or other wired or wireless mechanisms. As an example, the motors 78 may be wirelessly connected to the communication network 88.

The memory may store instructions executable by the processor to detect and identify the presence of an occupant on the seat 26. For example, the computer 82 may identify whether the occupant is seated in the seat 26. The computer 82 may make such identifications based on information received from the seat occupancy sensor 84 via the communication network 88.

The memory may store instructions executable by the processor to detect the extensions 24 are engaging the occupant of the seat 26. For example, the computer 82 may identify whether the extensions 24 are engaging the occupant. The computer 82 may make such identifications based on information received from the pressure sensor 86 via the communication network 88.

The computer 82 may, for example, be programmed with instructions to deploy the extensions 24 in response to detecting the presence of an occupant on the seat 26. In other words, when the occupant is detected on the seat 26, the computer 82 may actuate the motors 78 to drive the respective extensions 24 to the deployed position. Alternatively, the computer 82 may be programmed with instructions to deploy the extensions 24 in response to operation of the switch 80. In other words, when the switch 80 is operated, the computer 82 may actuate the motors 78 to drive the respective extension 24 between the deployed and the undeployed position.

The computer 82 may, for example, be programmed with instructions to retract the extensions 24 in response to detecting the latch 74 and the buckle 76 engaged in the engaged position. In other words, when the latch 74 and buckle 76 are engaged, the computer 82 may actuate the motors 78 to retract the respective extensions 24 toward the undeployed position. As another example, the computer 82 may be programmed with instructions to retract the extensions 24 in response to operation of the switch 80. In other words, when the switch 80 is operated by the occupant, the computer 82 may actuate the motors 78 to retract the respective extensions 24 towards the undeployed position. As yet another example, the computer 82 may, for example, be programmed with instructions to retract the extensions 24 in response to detecting the latch 74 and the buckle 76 are released from the engaged position to the disengaged position. In other words, when the latch 74 and the buckle 76 are released from the engaged position, the computer 82 may actuate the motors 78 to retract the respective extensions 24 to the undeployed position.

The computer 82 may, for example, be programmed with instructions to stop retracting the extensions 24 in response to detecting the extensions 24 engaging the occupant. In other words, when the extensions 24 engage, i.e., contact, the occupant, the computer 82 may actuate the motors 78 to stop retracting the respective extensions 24.

Figure 7:
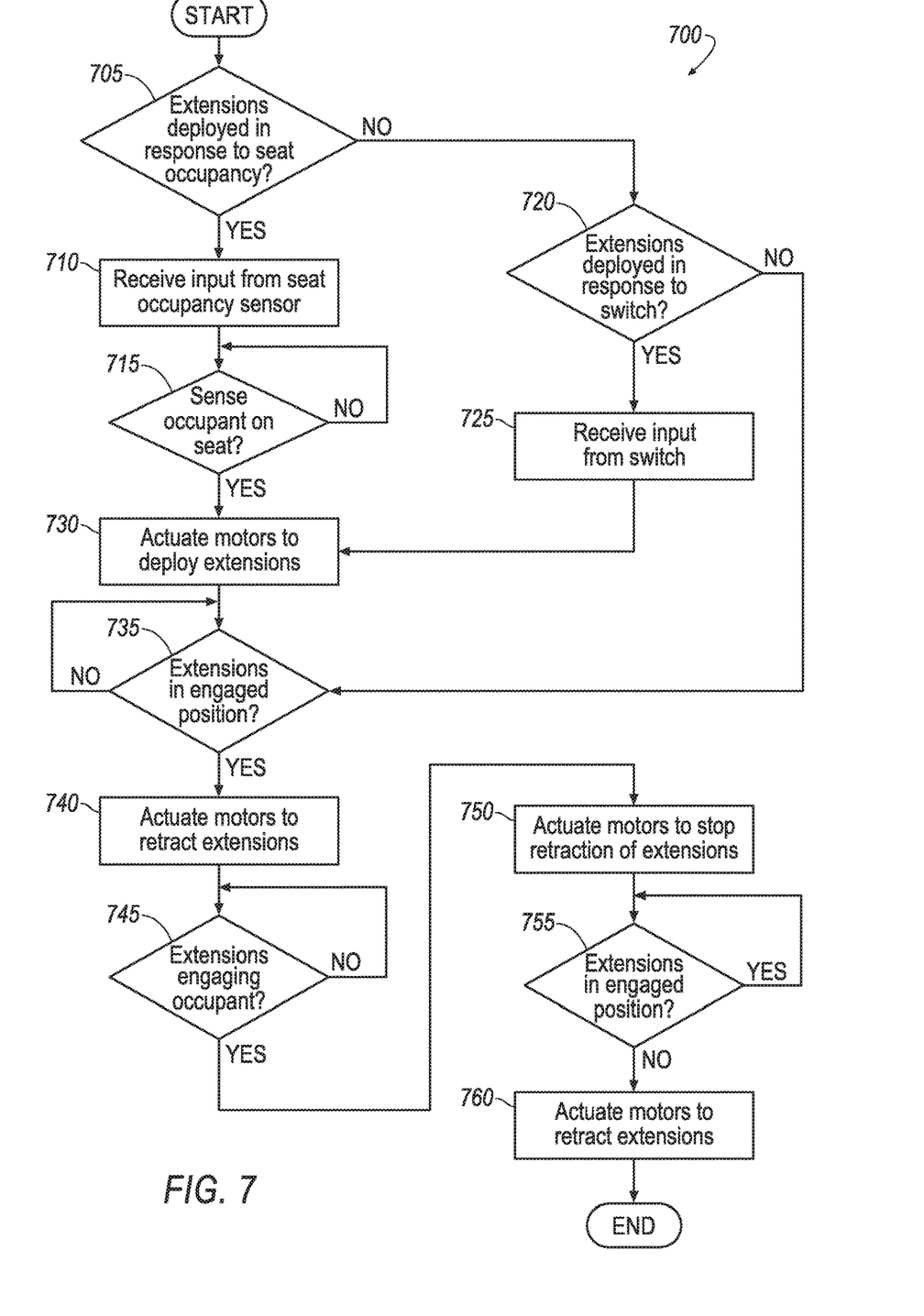
FIG. 7 is a flow chart showing a method of operating the restraint system of the vehicle.

A method 700 is shown in the flow chart in FIG. 7. The method 700 shown in FIG. 7 includes the operation of the restraint system 12 to restrain an occupant on the seat 26. The restraint system 12 may be operated manually, by operation of a switch, or automatically by the computer 82. When the extensions 24 are engaged with each other, the restraint system 12 retains the occupant on the seat 26, e.g., during a vehicle impact.

With reference to block 705, the method includes determining whether the extensions 24 are deployed in response to receiving input from the seat occupancy sensor 84, i.e., detecting an occupant seated on the seat 26. If the extensions 24 are deployed in response to detecting an occupant seated on the seat 26, then the method continues in block 710. Otherwise, the method continues in block 720.

In block 710, the method includes receiving input from the seat occupant sensor 84, and in decision block 715, the method includes determining whether an occupant is seated on the seat 26. The computer 82 determines an occupant is seated on the seat 26 based on information received from the seat occupancy sensor 84. For example, when an occupant is seated on the seat 26, the seat occupancy sensor 84 may send a signal to the computer 82 indicating the occupant is seated on the seat 26, e.g., a weight threshold is exceeded, the occupant is captured by an imaging system, etc. The method continues in block 730.

In the decision block 720, the method includes determining whether the extensions 24 are deployed in response to receiving input from the switch 80. When the occupant provides input to the switch 80, the computer 82 instructs the motors 78 to drive the respective extensions 24 from the undeployed position to the deployed position. If the extensions 24 are deployed in response to operation of the switch 80, the method continues in a block 730. Otherwise, the extensions 24 are deployed manually. In this situation, the motors 78 are disengaged from the respective extensions 24. In such an example, the occupant many physically pull the extensions 24 from the undeployed position to the deployed position. If the extensions 24 are manually deployed, the method continues in decision block 735.

In the block 725, the method includes receiving input from the switch 80. The method continues in the block 730. In the block 730, the method includes actuating the motors 78 to drive the respective extension 24 to the deployed position. For example, when the occupant provides input to the switch 80, the computer 82 instructs the motors 78 to drive the respective extension 24 into the deployed position. As another example, when the computer 82 receives input from the seat occupancy sensor 84 detecting an occupant on the seat 26, the computer 82 instructs the motors 78 to drive the respective extensions 24 from the undeployed position to the deployed position in response to receiving the input from the seat occupancy sensor 84, i.e., detecting the occupant on the seat 26. The method continues in the decision block 735.

In the decision block 735, the method includes determining whether the extensions 24 are in the engaged position. Specifically, the method includes determining whether the latch 74 and the buckle 76 are engaged with each other in the engaged position. For example, the buckle 76 may include a sensor to detect the latch 74 in the engaged position. The sensor may send information to the computer 82, and the computer 82 may determine the latch 74 and the buckle 76 are in the engaged position. When the extensions 24 are manually deployed, the computer 82 may instruct the motors 78 to engage the respective extensions 24 in the engaged position.

The latch 74 and the buckle 76 may, for example, be manually engaged, e.g., by the occupant, in the engaged position. In other words, the occupant may physically insert the latch 74 into the buckle 76. In such an example, latch 74 and buckle 76 may be spaced from each other in the deployed position, e.g., when the motors 78 stop driving the respective extensions 24. As another example, the motors 78 may drive the respective extensions 24 until the latch 74 and the buckle 76 are engaged in the engaged position. In this situation, the extensions 24 may have a shape such that the latch 74 and buckle 76 are aligned in the deployed position.

In a block 740, the method includes retracting the extensions 24. In other words, the computer 82 instructs the motors 78 to drive the respective extensions 24 to the undeployed position. Said differently, the computer 82 instructs the motors 78 to drive the respective extensions 24 in reverse, i.e., toward the respective arms 22. During retraction of the extensions 24, each extension 24 may contact the respective arm 22. In this situation, the force of each extension 24 on the respective arm 22 may pivot the respective arm 22 about the respective hinge 64. In other words, the arms 22 may pivot about the respective hinges 64 towards each other, i.e., the occupant.

In a decision block 745, the method includes determining the extensions 24 engage the occupant. When the extensions 24 engage the occupant, the pressure on the waist restraint 16, e.g., the extensions 24, the motors 78, etc. increases and the pressure sensor 86 sends information to the computer 82. The computer 82 may determine the extensions 24 are engaging the occupant in response to the information from the pressure sensor 86, i.e., the increased pressure on the waist restraint, e.g., the extensions 24, the motors 78, etc.

In a block 750, the method includes actuating the motors 78 to stop retracting the extensions 24. For example, when the computer 82 receives the information from the pressure sensor 86, the computer 82 instructs the motors 78 to stop retracting the respective extensions 24. By retracting the extensions 24 until the extensions 24 engage the occupant, the waist restraint 16 may be adjustable for occupants of varying sizes.

In a decision block 755, the method includes determining whether the extensions 24 are in the disengaged position. For example, when the latch 74 and the buckle 76 are disengaged in the disengaged position, the sensor may send information to the computer 82, and the computer 82 may determine the latch 74 and the buckle 76 are in the disengaged position.

In a block 760, the method includes retracting the extensions 24 to the undeployed position. For example, when the extensions 24 are in the disengaged position, the computer 82 may actuate the motors 78 to retract the respective extensions 24 to the undeployed position. For example, when the extensions 24 are deployed in response to detecting the occupant on the seat 26, the computer 82 actuates the motors 78 to retract the respective extensions 24 to the undeployed position. As another example, when the extensions 24 are deployed in response to operation of the switch 80, the computer 82 actuates the motors 78 to retract the respective extensions 24 in response to operation of the switch 80. In such an example, the occupant may activate the switch 80 to retract the extensions 24 to the undeployed position.

With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments and should in no way be construed so as to limit the disclosed subject matter.

Computing devices, such as the computer 82, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

When the waist restraint 16 is not in use, i.e., when the seat 26 is empty, the extensions 24 may be retracted into the seatback 14, i.e., in the undeployed position. When the occupant is seated on the seat 26, the extensions 24 may be deployed from the seatback 14 and engaged in front of the occupant, e.g., manually, by operation of the switch 80, or automatically by the computer 82. When the extensions 24 are engaged, the computer 82 may instruct the motors 78 to retract the extensions 24 until the extensions engage the occupant. In this situation, the extensions 24 may contact the respective arm 22 causing the arm 22 to pivot toward the occupant. In such an example, the waist restraint 16, when in use, may adapt to the size of the occupant. Additionally, the occupant may select a position for the seat 26 to face other occupants or enjoy a panoramic view of the environment outside the vehicle 10. As the seat 26 rotates, the restraint system 12 allows the waist restraint 16 to move with the seat 26 and maintain the four-point restraint of the occupant, i.e., retain the occupant on the seat 26.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A restraint system comprising:
   a seatback;
   a waist restraint including a housing having a middle portion fixed to the seatback and two arms extending outwardly from the middle portion;
   the waist restraint including an extension deployable from each arm to a deployed position, the extensions engaged with each other in the deployed position; and
   each arm hinged to the middle portion and pivotable towards the other arm;
   wherein the housing defines a void extending through the middle portion and each arm, each extension partially disposed in the void of the middle portion.

2. The restraint system of claim 1, wherein the extensions overlap each other in the void of the middle portion in an undeployed position.

3. The restraint system of claim 2, wherein the middle portion includes a wall extending transversely across the void, the extensions disposed on opposite side of the wall in the undeployed position.

4. The restraint system of claim 1, further comprising a latch disposed on one extension and a buckle disposed on the other extension, the latch and the buckle engageable with each other to an engaged position.

5. The restraint system of claim 4, further comprising a webbing fixed to each extension, the latch and the buckle are disposed between the webbings.

6. The restraint system of claim 5, wherein each webbing is a shoulder belt.

7. The restraint system of claim 1, wherein each extension is bendable relative to the respective arm.

8. The restraint system of claim 7, wherein each extension is plastic.

9. The restraint system of claim 1, further comprising a motor engaged with each extension, each of the motors supported by the seatback.

10. The restraint system of claim 9, wherein each motor contacts the respective extension between the arms.

11. The restraint system of claim 9, wherein the motors are laterally offset from each other.

12. The restraint system of claim 1, further comprising a processor and a memory storing instructions to deploy the extensions to the deployed position in response to detecting a presence of an occupant.

13. The restraint system of claim 12, wherein the memory stores instructions to retract the extensions from the deployed position in response to detecting the extensions are engaged with each other in an engaged position.

14. The restraint system of claim 13, wherein the memory stores instructions to stop retracting the extensions in response to the extensions engaging the occupant.

15. The restraint system of claim 12, wherein the memory stores instructions to retract the extensions from the deployed position in response to detecting the extensions are released from an engaged position to a disengaged position.

16. The restraint system of claim 1, further comprising a processor and a memory storing instructions to deploy the extensions to the deployed position in response to operation of a switch.

17. The restraint system of claim 16, wherein the memory stores instructions to retract the extensions in response to operation of a switch.

18. The restraint system of claim 1, wherein the seatback includes a first bolster and a second bolster spaced from each other, one arm extending outwardly from the first bolster, and the other arm extending outwardly from the second bolster.

19. The restraint system of claim 1, wherein the housing has a semicircular shape, and each extension has an arc shape.

20. A restraint system comprising:
   a seatback;
   a waist restraint including a housing having a middle portion fixed to the seatback and two arms extending outwardly from the middle portion;
   the waist restraint including an extension deployable from each arm to a deployed position, the extensions engaged with each other in the deployed position;
   each arm hinged to the middle portion and pivotable towards the other arm; and
   a processor and a memory storing instructions to:
      deploy the extensions to the deployed position in response to detecting a presence of an occupant;
      retract the extensions from the deployed position in response to detecting the extensions are engaged with each other in an engaged position; and
      stop retracting the extensions in response to the extensions engaging the occupant.

* * * * *